(12) United States Patent
Mahabob et al.

(10) Patent No.: US 11,897,538 B1
(45) Date of Patent: Feb. 13, 2024

(54) STEERING WHEEL WITH DISPLAY AND GEAR CONTROL

(71) Applicant: KING FAISAL UNIVERSITY, Al-Ahsa (SA)

(72) Inventors: Nazargi Mahabob, Al-Ahsa (SA); Mohammad Aariz, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 10 days.

(21) Appl. No.: 18/202,554

(22) Filed: May 26, 2023

(51) Int. Cl.
 *B62D 1/04* (2006.01)
 *F16H 59/04* (2006.01)

(52) U.S. Cl.
 CPC ........... *B62D 1/046* (2013.01); *F16H 59/044* (2013.01)

(58) Field of Classification Search
 CPC .............................. B62D 1/046; F16H 59/044
 See application file for complete search history.

(56) References Cited

U.S. PATENT DOCUMENTS

| 8,843,268 B2 | 9/2014 | Lathrop |
| 10,583,855 B2 | 3/2020 | Toddenroth |

FOREIGN PATENT DOCUMENTS

| CN | 202345748 U | 7/2012 | | |
| CN | 107697149 A | 2/2018 | | |
| CN | 207565338 U | * 7/2018 | | |
| CN | 113002614 A | 6/2021 | | |
| CN | 217778725 U | 11/2022 | | |
| DE | 102016200022 A1 | * 7/2017 | ............. | B60K 35/00 |
| WO | WO-2007021263 A1 | * 2/2007 | ............. | B60K 35/00 |

OTHER PUBLICATIONS

NPL1—"China's Byton Thinks a Steering Wheel-Mounted Tablet Is a Great Idea" by Michael Gauthier, published online on Jan. 2, 2019.

* cited by examiner

*Primary Examiner* — Jacob D Knutson
(74) *Attorney, Agent, or Firm* — Nath, Goldberg & Meyer; Richard C. Litman

(57) ABSTRACT

A steering wheel system includes a steering wheel; selection areas on the steering wheel to select a gear; and a control unit that selects the gear according to the selection area selected.

10 Claims, 3 Drawing Sheets

STEERING WHEEL WITH DISPLAY AND GEAR CONTROL

BACKGROUND

1. Field

The present disclosure relates to changing gears on a transmission, and particularly to a system and method for changing gears on a transmission using inputs located on a steering wheel.

2. Description of the Related Art

In general, systems and methods for changing gears on an automotive transmission are limited to the use of a gear box. Manual automotive transmissions change gears using a gear box and a clutch. These gear boxes can, for example, change from first gear to fifth gear. Neutral and reverse are additional positions into which the transmission can move. Automatic transmissions are developed for user convenience, and provide a gear box with a parking position, reverse position, neutral position and drive positions. The gears of the transmission are changed automatically, negating the need for a clutch. Gearboxes in vehicles are located along the center line of a vehicle, in line with the transmission.

SUMMARY

A steering wheel with gear control includes buttons or adjustable buttons configured to control the gears of a transmission or other features, such as, cruise control or mode change buttons, including terrain selection and four wheel drive.

The gears can be placed in positions, such as, park, reverse, neutral and drive. A digital display can be incorporated into the steering wheel system, and be, for example, a touchscreen that helps to control other features such as temperature of the car, audio system and volume control.

The steering wheel will help the driver to work more efficiently and helps to respond to any feature quickly. As the features and their control will be incorporated in the steering wheel, that will result in more vehicle space.

A steering wheel system, in one embodiment, includes a steering wheel; selection areas on the steering wheel configured to select a gear; and a control unit configured to control the selection of the gear according to the selection area selected.

The steering wheel system further includes a display.

The selection areas, in some embodiments, are located on the display.

The selection areas, in some embodiments, are buttons.

The buttons include a park button, a reverse button, a neutral button, and a drive button.

The control unit includes a wireless transmitter configured to send a signal to a wireless receiver to select a selected gear in a transmission of the vehicle.

The disclosed subject matter also includes various methods. In a non-limiting embodiment, a method for selecting a gear in a steering wheel system includes: selecting a gear from a selection area provided on a steering wheel; transmitting a signal that identifies the selected gear to a control unit once one of the selection areas is selected by a user; and transmitting a signal from the control unit to a receiver to change the gear in a transmission.

The method further includes providing a display on the steering wheel.

The method, in other embodiments, includes providing the selection areas on the display.

The selection areas, in some embodiments, are buttons.

The buttons include a park button, a reverse button, a neutral button, and a drive button.

The control unit includes a wireless transmitter that sends a signal to the receiver to select a selected gear in a transmission.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

A steering wheel incorporates push buttons or adjustable buttons like cruise control or mode change button. The other features that the steering wheel incorporates include, without limitation, parking/reverse/neutral/drive, terrain selection mode and a digital display. The digital display includes a touchscreen configured to help control features such as temperature of the car, audio system and volume control, as well as the above features. The new design will help the driver to work more efficiently and to respond to any feature quickly. As the features are incorporated in the steering wheel, that will result in more vehicle space.

Figure 1:
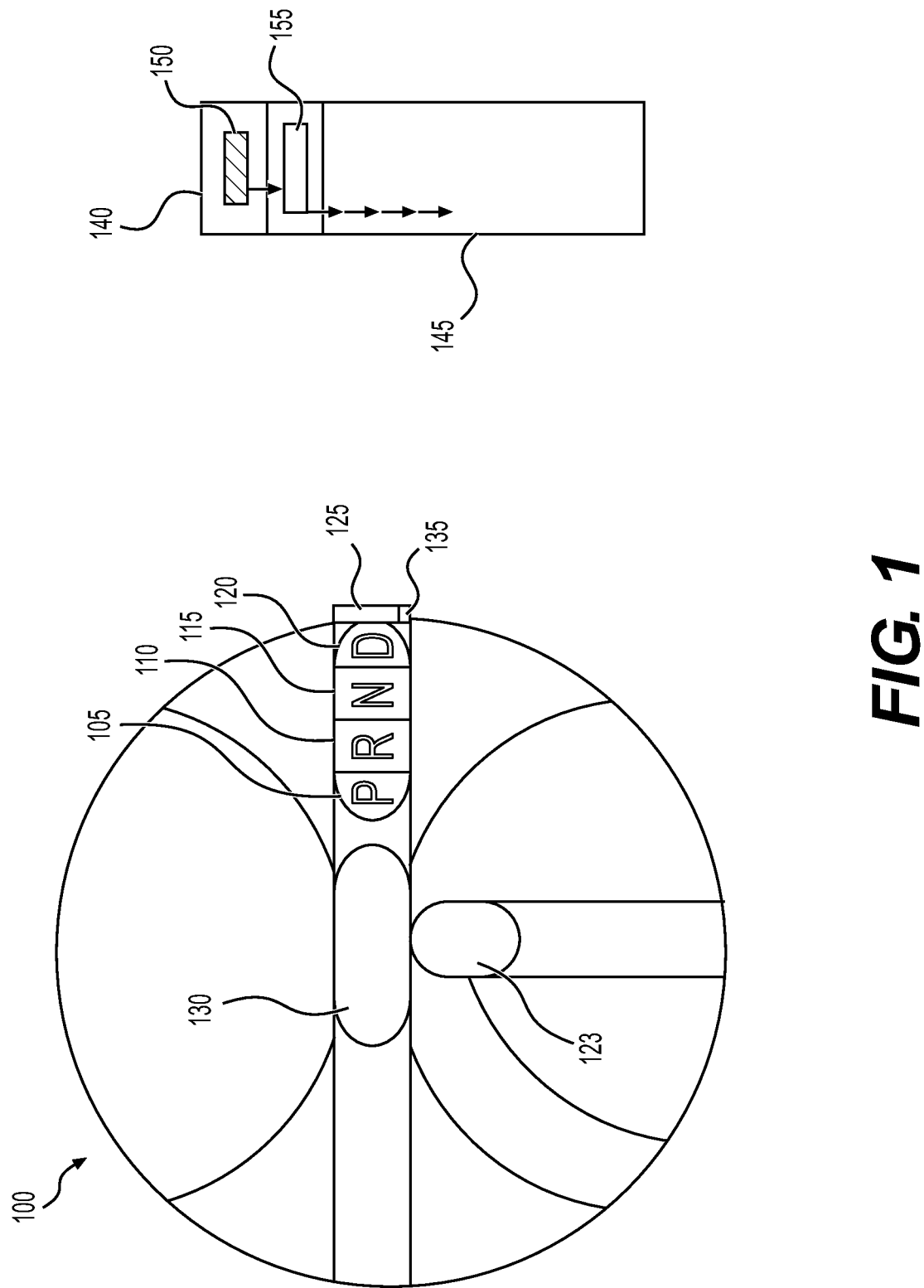
FIG. 1 is an illustration of a steering wheel according to an embodiment of the present subject matter.

FIG. 1 is an illustration of a steering wheel 100 that includes selection areas 105,110,115,120 configured to select a gear, and a control unit 125 configured to select the gear according to the selection area 105,110,115,120 selected. The steering wheel 100 further includes a display 130.

The selection areas 105,110,115 and 120, in some embodiments, are located on the display 130. The selection areas 105,110,115 and 120, in some embodiments, are buttons. The buttons include a park button 105, a reverse button 110, a neutral button 115 and a drive button 120. Other buttons, such as button 123, for options such as terrain control, cruise control, mode change buttons, including terrain selection and four wheel drive, temperature control, audio system control, volume control or any other optional vehicle control can also be included. This will allow the driver to work effectively and respond to any situation very quickly. It will also give more space in the vehicle.

The control unit 125 includes a wireless transmitter 135. A wireless signal is sent from the wireless transmitter 135 to a wireless receiver 140 to select a selected gear in a transmission. The wireless receiver 140 is located in a gearbox 145. The buttons 105, 110, 115, 120 and 123 can, therefore, be configured to be directly connected to the gearbox 145 wirelessly via wireless transmitter 135 and wireless receiver 140.

Figure 2:
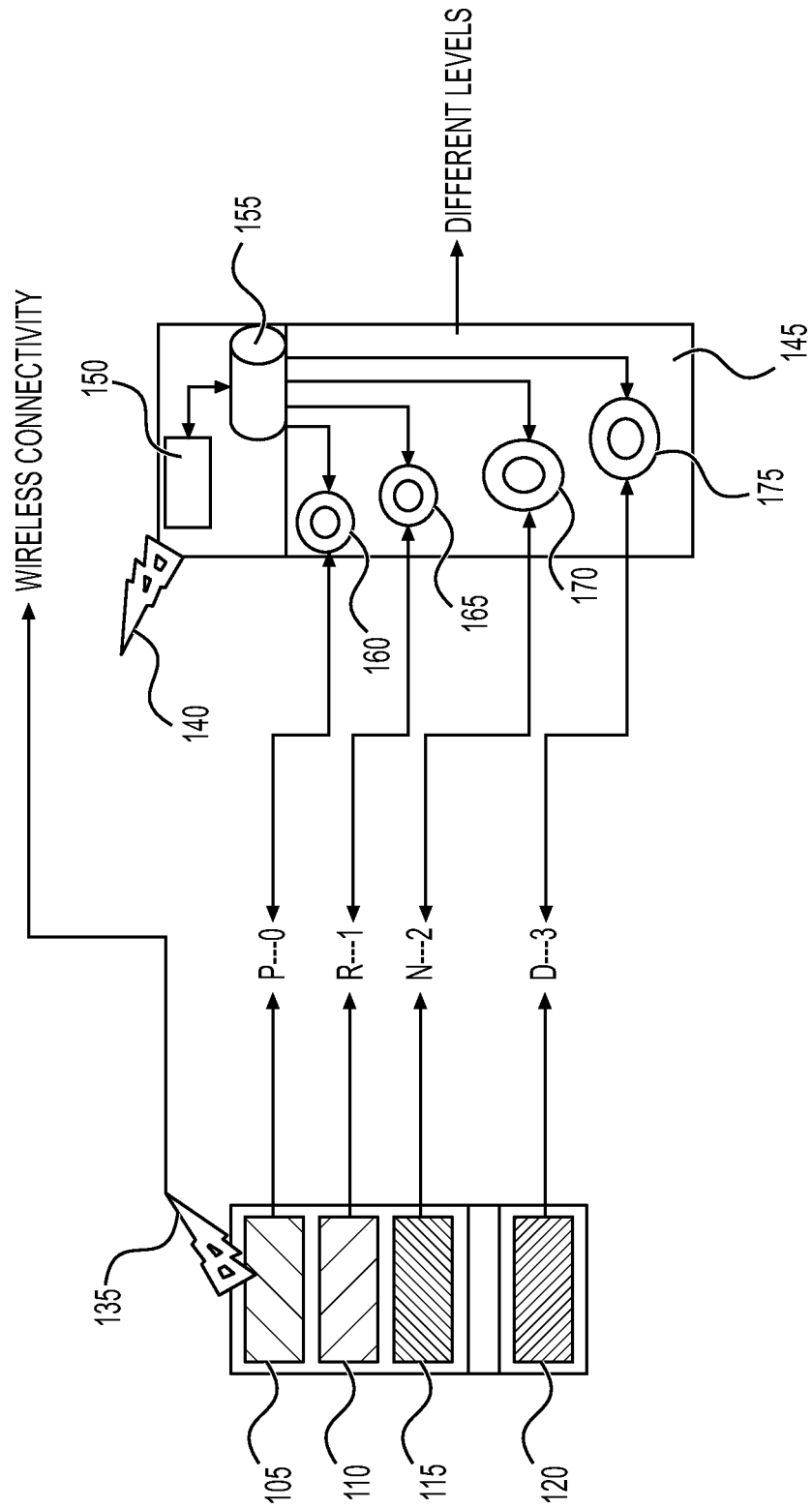
FIG. 2 is an illustration of buttons on the steering wheel and a gearbox.

FIG. 2 is an illustration of the buttons 105,110,115 and 120 and the gearbox 145. A wireless signal is transmitted from the wireless transmitter 135 to the wireless receiver 140 when one of the buttons 105,110,115 or 120 is pressed. The wireless receiver 140 is located in the gearbox 145 and is configured to activate a coded preprogrammed chip 150 also located in the gearbox 145. The coded preprogrammed chip 150 communicates with a motorized lever 155 that changes rod position 160,165,170,175 on the transmission. In a non-limiting embodiment, the codes for the gears are as follows: P=0, R=1, N=2, D=3. However, other such codes can be used for controlling the gears. In this non-limiting embodiment, when button 105 corresponding to P is pressed, the coded preprogrammed chip 150 moves motorized lever 155 to rod position 160, which corresponds to P. Likewise, when button 110, corresponding to R for reverse is pressed, coded preprogrammed chip 150 moves motorized lever 155 to rod position 165, which corresponds to R. It follows that rod position 170 is selected when button 115 is pressed corresponding to N for neutral, and rod position 175 is selected when button 120 is pressed corresponding to D corresponding to drive.

An aspect of the present subject matter is the selection of the gear position through the touchscreen display located in the steering wheel. As indicated above, other functionalities can also be managed through the touchscreen display in the steering wheel. FIG. 1 denotes an other button by the reference numeral 123. It is to be understood that this is a symbolic button and more than one other button can be displayed on the touchscreen display. A manufacturer can include any number of other buttons 123, depending on the number of further functionalities that are desired to be controlled using the touchscreen display, including those further functionalities described herein. Other buttons 123 are configured to control the further functionalities via software and hardware located in the vehicle.

Figure 3:
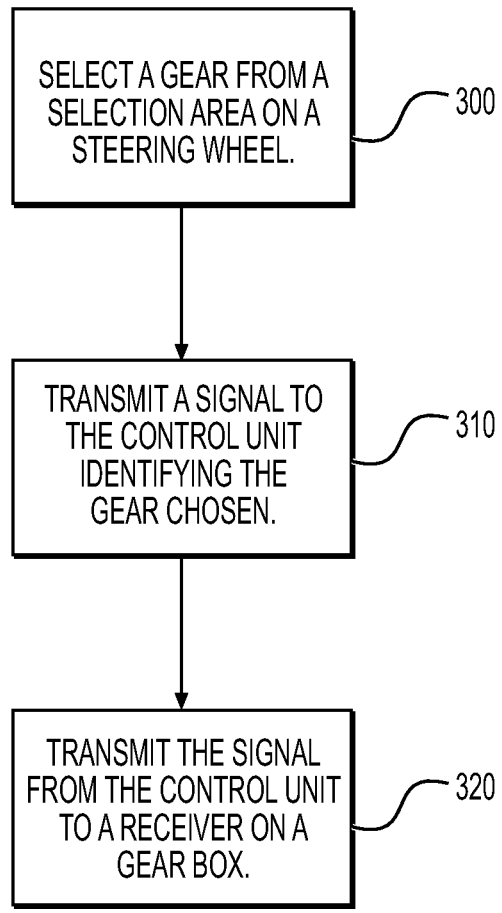
FIG. 3 is a flow diagram of a method for selecting a gear in a steering wheel system.

FIG. 3 is a flow diagram of a method for selecting a gear in a steering wheel system. In box 300 of the flow diagram, a gear is selected from a selection area on a steering wheel. A control unit receives a signal that identifies the selected gear in flow diagram box 310 corresponding to the selection area or button selected by a user. A signal identifying the gear chosen by the user, in flow diagram box 320, is transmitted from the control unit to a receiver to change the gear in a transmission. The control unit 125 includes a wireless transmitter 135, in some embodiments, that transmits the signal to a wireless receiver 140 on the gear box 145.

It is to be understood that the steering wheel system and method for selecting a gear is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A steering wheel system, comprising:
   a steering wheel;
   selection areas on the steering wheel configured to select a gear when pressed by a user; and
   a control unit configured to select the gear according to the selection area selected, wherein the control unit comprises a wireless transmitter configured to send a signal to a wireless receiver located within a gearbox to select a selected gear in a transmission based on the selection area selected.

2. The steering wheel system as recited in claim 1, further comprising a display on the steering wheel.

3. The steering wheel system as recited in claim 2, wherein the selection areas are located on the display.

4. The steering wheel system as recited in claim 1, wherein the selection areas are buttons.

5. The steering wheel system as recited in claim 4, wherein the buttons comprise a park button, a reverse button, a neutral button, and a drive button.

6. A method for selecting or changing a gear in a steering wheel system, the method comprising:
   selecting a gear from a plurality of selection areas provided on the steering wheel;
   transmitting a signal that identifies the selected gear to a control unit once one of the plurality of selection areas is selected by a user; and
   transmitting a signal from the control unit to a receiver, the receiver being located in a gearbox, to change the gear in a transmission, wherein the control unit comprises a wireless transmitter that sends a signal to the receiver to select a selected gear in a transmission.

7. The method as recited in claim 6, further comprising providing a display on the steering wheel.

8. The method as recited in claim 7, further comprising providing the plurality of selection areas on the display.

9. The method as recited in claim 6, wherein the plurality of selection areas are buttons.

10. The method as recited in claim 9, wherein the buttons comprise a park button, a reverse button, a neutral button, and a drive button.

* * * * *